United States Patent [19]
Chen

[11] Patent Number: 5,851,459
[45] Date of Patent: Dec. 22, 1998

[54] METHOD FOR MANUFACTURING CRANKS FOR BICYCLES

[76] Inventor: Jason Chen, No. 6, Lane 468, Section 4, Chang Shui Road, Pi Tou Hsiang, Chang Hua Hsien, Taiwan

[21] Appl. No.: 989,679

[22] Filed: Dec. 12, 1997

Related U.S. Application Data

[63] Continuation-in-part of Ser. No. 829,036, Mar. 31, 1997, abandoned.

[51] Int. Cl.$^6$ ............................ B29C 44/06; B29C 44/12
[52] U.S. Cl. ...................... 264/46.7; 264/46.4; 264/161; 264/232
[58] Field of Search .................................. 264/46.4, 46.7, 264/129, 161, 232, 321

[56] References Cited

U.S. PATENT DOCUMENTS

| | | | |
|---|---|---|---|
| 4,460,423 | 7/1984 | Bosnia | 156/185 |
| 4,650,620 | 3/1987 | Owen et al. | 264/45.5 |
| 4,836,964 | 6/1989 | Tsai | 264/46.7 |
| 5,042,968 | 8/1991 | Fecto | 416/226 |
| 5,152,856 | 10/1992 | Thein et al. | 156/79 |
| 5,316,709 | 5/1994 | Ko et al. | 264/51 |
| 5,435,869 | 7/1995 | Christensen | 156/175 |
| 5,632,940 | 5/1997 | Whatley | 264/46.4 |

FOREIGN PATENT DOCUMENTS

| | | | |
|---|---|---|---|
| 225 944 | 8/1985 | Germany | 264/46.7 |

*Primary Examiner*—Allan R. Kuhns
*Attorney, Agent, or Firm*—Charles E. Baxley, Esq.

[57] ABSTRACT

A method is illustrated for manufacturing bicycle cranks in which a layer of foamable material is applied on an outer surface of a metallic member which has two holes respectively defined in two ends thereof. A layer of composite preimpregnated material is then applied on the layer of foamable material. Thereafter, the metallic member is mounted in a mold and then heated to make the foamable material foam, thereby achieving formation of a semi-product crank by means of formation of the foamable material, the composite preimpregnated material, and the metallic member. After removal from the mold, the holes of the semi-product crank is tapped, and the semi-product crank is then trimmed and ground. Patching is applied to make an outer surface of the crank smooth.

4 Claims, 5 Drawing Sheets

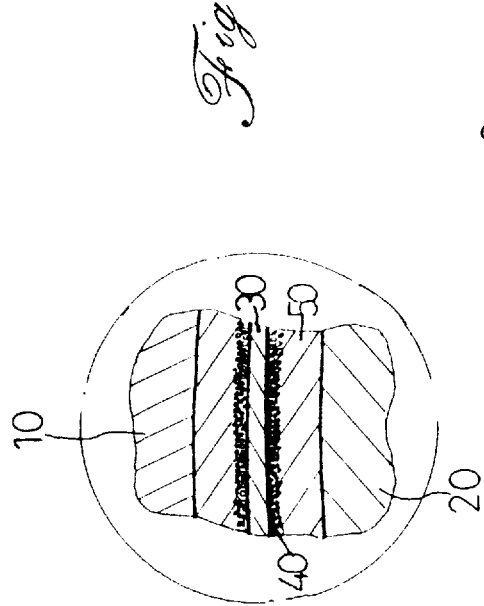
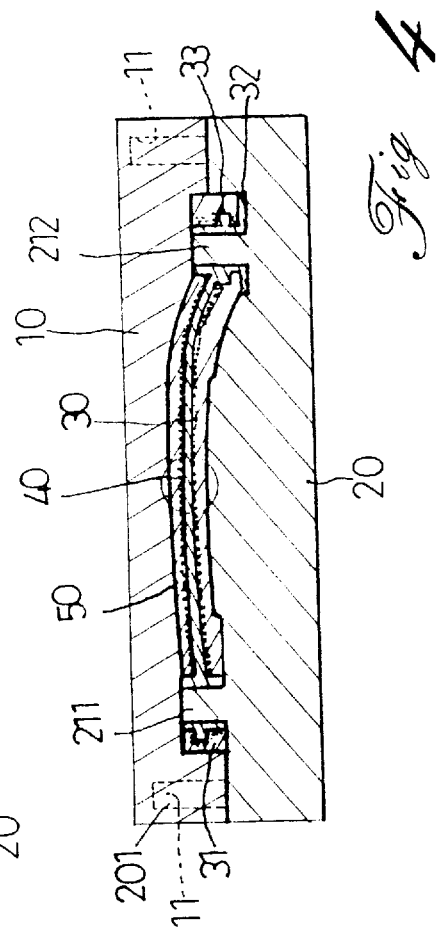

METHOD FOR MANUFACTURING CRANKS FOR BICYCLES

CROSS-REFERENCE TO RELATED APPLICATION

This is a continuation-in-part application of U.S. patent application Ser. No. 08/829,036 filed on Mar. 31, 1997, now abandoned.

BACKGROUND OF THE INVENTION

1. Field of the Invention

The present invention relates to a method for manufacturing bicycle cranks.

2. Description of the Related Art

Iron has been replaced by aluminum in manufacture of bicycle frames so as to provide a light structure for bicycles. It is a trend to use composite material to achieve the purpose of light structures, yet the resistance to impact and rigidity of the resultant frame are poor. The present invention is intended to provide an improved method for manufacture of light bicycle cranks without adversely affecting the rigidity and the resistance to impact.

SUMMARY OF THE INVENTION

A method for manufacturing bicycle cranks in accordance with the present invention comprises the following steps of:
(a) applying a layer of foamable material on an outer surface of a metallic member which has two holes respectively defined in two ends thereof;
(b) applying a layer of composite preimpregnated material on the layer of foamable material;
(c) mounting the metallic member of step (b) in a mold including an upper mold section and a lower mold section;
(d) heating the mold to make the foamable material foam, thereby achieving formation of a semi-product crank by means of formation of the foamable material, the composite preimpregnated material, and the metallic member;
(e) tapping the holes of the semi-product crank and trimming the semi-product crank; and
(f) grinding and patching the semi-product crank to make an outer surface of the crank smooth.

Spraying painting may be applied to the outer surface of the semi-product crank to match with the color of the bicycle frame.

Preferably, the metallic member is an aluminum so as to provide a light crank.

Other objects, advantages, and novel features of the invention will become more apparent from the following detailed description when taken in conjunction with the accompanying drawings.

BRIEF DESCRIPTION OF THE DRAWINGS

FIG. 3 is a cross-sectional view of the mold with the crank raw material mounted therein;

FIG. 4 is an enlarged view of a circle in FIG. 3;

DESCRIPTION OF THE PREFERRED EMBODIMENT

Figure 1:
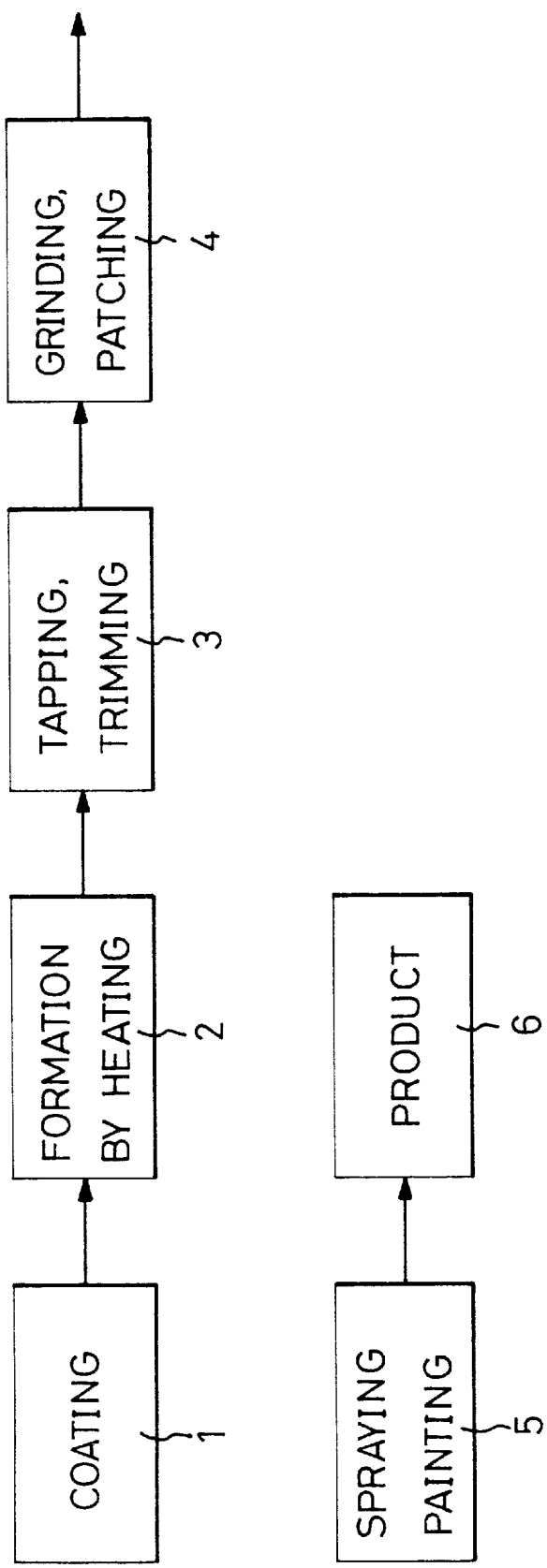
FIG. 1 is a block diagram illustrating the steps of the present invention for manufacturing a bicycle crank.
Figure 2:
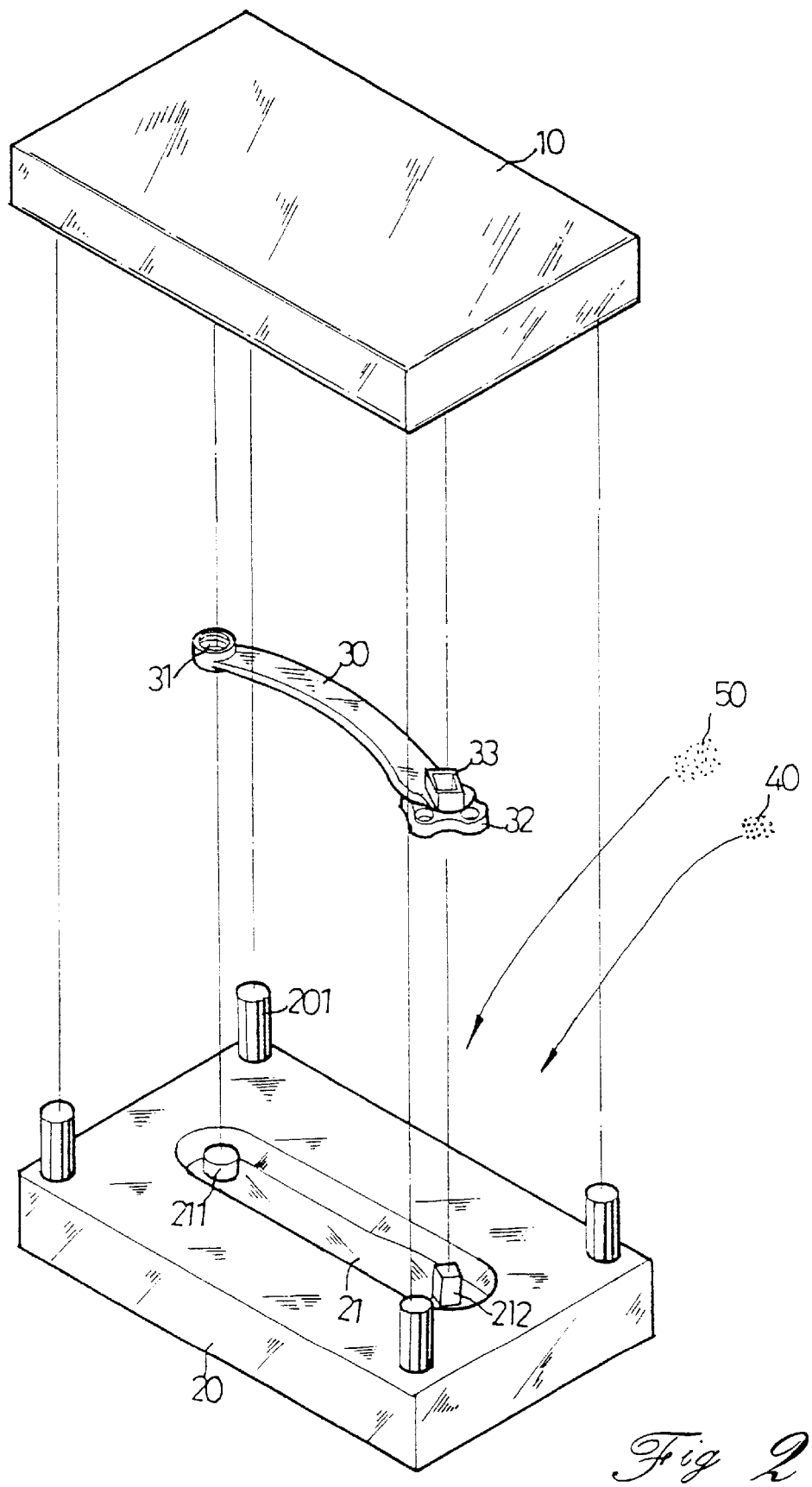
FIG. 2 is an exploded view illustrating the a mold and a raw material of a bicycle crank.

Referring to the drawings and initially to FIGS. 1 and 2, a first step of a method for manufacturing bicycle cranks in accordance with the present invention includes providing a metallic member 30 and applying a layer of foamable material 40 on an outer surface of the metallic member 30. As shown in FIG. 2, the metallic member 30 includes a round hole 31 in a first end thereof. The second end of the metallic member 30 further includes a reinforced section 32 in which a square hole 33 is defined. The foamable material 40 is preferably epoxy resin having a weight of about 10% of that of the metallic member 30. In this embodiment, the metallic member 30 has a weight of 65 g while the epoxy resin has a weight of 15 g.

Then, a layer of composite preimpregnated material 50 is applied on the layer of foamable material 40. In this embodiment, the composite preimpregnated material 50 has a weight of 75 g.

After coating of the foamable material 40 and the composite preimpregnated material 50 (see FIG. 4 and step 1 of FIG. 1), the metallic member 30 is mounted in a mold including an upper mold section 10 and a lower mold section 20. As shown in FIG. 2, the lower mold section 20 includes four posts 201 respectively on four corners of an upper side thereof. The upper side of the lower mold section 20 further includes a receiving compartment 21 defined therein, in which a bottom wall defining the receiving compartment 21 has a round stub 211 on a first end thereof and a square stub 212 on a second end thereof. The upper mold section 10 includes four receiving holes 11 (see FIG. 3) defined in an underside thereof for receiving the posts 201.

The composite preimpregnated material may comprise carbon fiber, glass fiber, and aramid fiber.

The mold is then heated at 140° C.–160° C. for about 10 minutes to 45 minutes to make the foamable material 40 foam, thereby achieving formation of a semi-product crank by means of formation of the foamable material 40, the composite preimpregnated material 50, and the metallic member 30 (see step 2 in FIG. 1).

Figure 5:
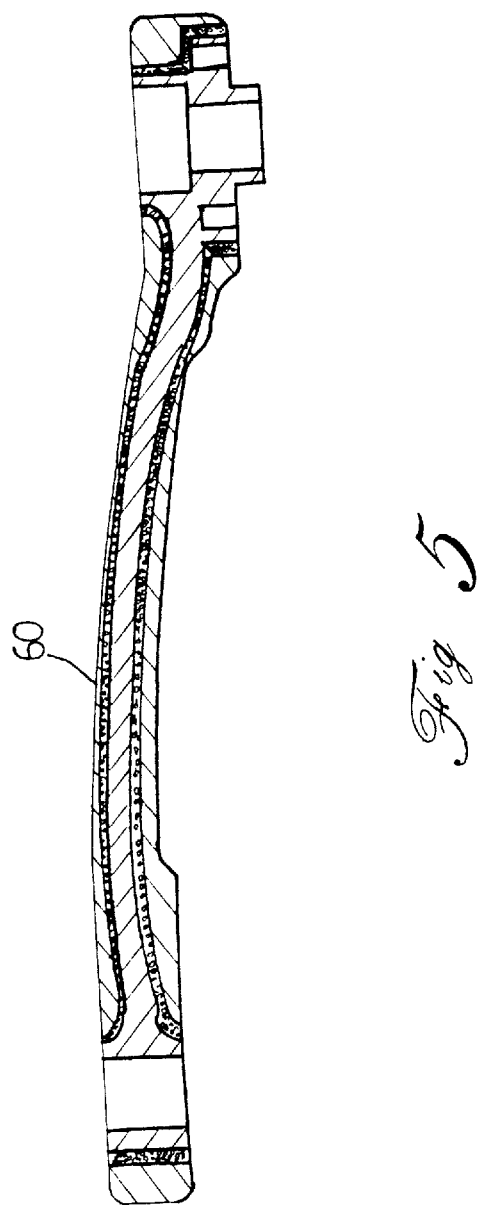
FIG. 5 is a cross-sectional view of the crank manufactured by the method in accordance with the present invention.
Figure 6:
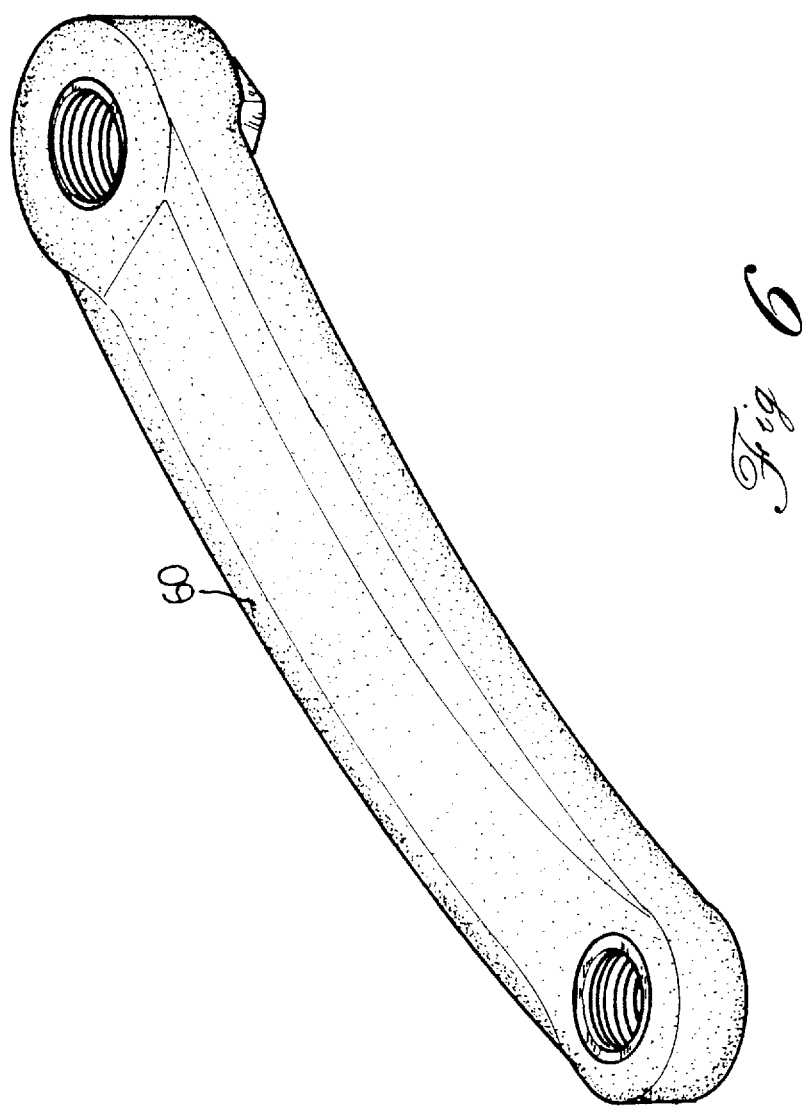
FIG. 6 is a perspective view of the crank.

The semi-product crank 30 is then removed from the mold and the two holes 31 and 33 thereof are tapped, and the semi-product crank 30 is trimmed (step 3 in FIG. 1). The semi-product crank 30 is ground and then patched by polyputty (step 4 in FIG. 1) to make an outer surface thereof smooth. Finally, the outer surface of the semi-product crank is further processed by spray-painting to provide a desired color to match with that of the bicycle frame (step 5 in FIG. 1), thereby providing a final product (see reference numeral "6" in FIG. 1) of a bicycle crank 60, as shown in FIGS. 5 and 6.

According to the above description, it is appreciated that the crank made in accordance with the present method is light and is durable to impact without adversely affecting the rigidity thereof due to using aluminum and coated with foam material and composite preimpregnated material. This is a breakthrough in the manufacture of bicycle cranks.

Although the invention has been explained in relation to its preferred embodiment, it is to be understood that many other possible modifications and variations can be made without departing from the spirit and scope of the invention as hereinafter claimed.

What is claimed is:

1. A method for manufacturing bicycle cranks, comprising the following steps of:
(a) applying a layer of foamable material on an outer surface of a metallic member which has two holes respectively defined in two ends thereof;

(b) applying a layer of composite preimpregnated material on the layer of foamable material;

(c) mounting the metallic member of step (b) in a mold including an upper mold section and a lower mold section;

(d) heating the mold to make the foamable material foam, thereby achieving formation of a semi-product crank by means of formation of the foamable material, the composite preimpregnated material, and the metallic member;

(e) tapping the holes of the semi-product crank and trimming the semi-product crank; and (f) grinding and patching the semi-product crank to make an outer surface of the crank smooth.

2. The method according to claim 1, further comprising a step of:

(g) applying spraying painting to the outer surface of the semi-product crank.

3. The method according to claim 1, wherein the metallic member is an aluminum.

4. The method according to claim 1, wherein the composite preimpregated material comprises carbon fiber, glass fiber, and aramid fiber.

* * * * *